United States Patent [19]
Sandison

[11] Patent Number: 5,838,435
[45] Date of Patent: Nov. 17, 1998

[54] CALIBRATION METHOD FOR SPECTROSCOPIC SYSTEMS

[75] Inventor: David R. Sandison, Edgewood, N. Mex.

[73] Assignee: Sandia Corporation, Albuquerque, N. Mex.

[21] Appl. No.: 953,814

[22] Filed: Oct. 20, 1997

[51] Int. Cl.$^6$ ............... G01J 1/10; G01J 3/443; G01N 21/64

[52] U.S. Cl. ............ 356/243; 250/252.1; 250/458.1; 356/318

[58] Field of Search ............ 356/317, 318, 356/417, 243; 250/252.14, 458.1, 459.1, 461.1, 461.2

[56] References Cited

U.S. PATENT DOCUMENTS

| | | | |
|---|---|---|---|
| 5,321,970 | 6/1994 | Davies et al. | 356/328 |
| 5,414,258 | 5/1995 | Liang | 250/252.1 |
| 5,689,110 | 11/1997 | Dietz et al. | 250/252.1 |

OTHER PUBLICATIONS

Yuval Garini, Nir Katzir, Dario Cabib, A. Buckwald, Dirk G. Soenksen and Zvi Malik; *Spectral Bio–Imaging*—Fluorescence Imaging Spectroscopy and Microscopy, 1996.

Robert Bacallao, Kianush Kiai, and Lynn Jesaitis; *Guiding Principles of Specimen Preservation for Confocal Fluorescence Microscopy*—Handbook of Biological Confocal Microscopy, Plenum Press, New York, 1995.

Cristopher Cunanan, *A Universal Method for Determining Fluorometer Sensitivity*—Biomedical Products, Oct. 1994.

A. Christyne Bliton and James D. Lechleiter, *Optical Considerations at Ultraviolet Wavelengths in Confocal Microscopy*—Handbook of Biological Confocal Microscopy, Plenum Press, New York, 1995.

*Primary Examiner*—Frank G. Font
*Assistant Examiner*—Zandra V. Smith
*Attorney, Agent, or Firm*—V. Gerald Grafe

[57] ABSTRACT

Calibration spots of optically-characterized material placed in the field of view of a spectroscopic system allow calibration of the spectroscopic system. Response from the calibration spots is measured and used to calibrate for varying spectroscopic system operating parameters. The accurate calibration achieved allows quantitative spectroscopic analysis of responses taken at different times, different excitation conditions, and of different targets.

23 Claims, 2 Drawing Sheets

CALIBRATION METHOD FOR SPECTROSCOPIC SYSTEMS

This invention was made with Government support under Contract DE-AC04-94AL85000 awarded by the U.S. Department of Energy. The Government has certain rights in the invention.

BACKGROUND OF THE INVENTION

This invention relates to the field of spectroscopic systems, specifically methods for calibration of spectroscopic systems.

Many materials express light when excited by incident light. The characteristics of expressed light in response to various excitation light wavelengths can identify the material. Different response spectra can also identify different material properties, as for example in cervical cells where pre-cancerous cells have different response spectra than normal cells. See, e.g., Garfield et al., U.S. Pat. No. 5,450, 857; Ramanujam et al., U.S. Pat. No. 5,421,339. Different spectral responses can also be measured using a microscope to differentiate components within a single cell, such as the nucleus, Golgi apparatus, and cytoplasmic vacuoles. See, e.g., Garini, Katzir, Cabib, Buckwald, "Spectral Bioimaging", Chapter 4, Fluorescence Imaging Spectroscopy and Microscopy, Wang and Herman editors. Sometimes different cellular components are labeled with different fluorescent dyes that have distinct spectral responses, making the components spectrally distinct. See, e.g., Bacallao, Kiai, Jesaitis, "Guiding Principles of Specimen Preservation for Confocal Fluorescence Microscopy", Chapter 18, Handbook of Biological Confocal Microscopy, $2^{nd}$ edition, Jim Pawley editor. In all of the above cases it is assumed that the instrument response is constant over the time required to make a complete set of spectral measurements.

A typical calibration method uses a reference target with a known response. See, e.g., C. Cunanan, "A Universal Method for Determining Fluorometer Sensitivity", Biomedical Products, October 1994. The spectroscopic system delivers excitation radiation with selected characteristics (e.g., wavelength, intensity, duration) to the reference target. The spectroscopic system collects the response and generates a signal representative thereof. The known response can determine a predicted signal. The generated signal, compared to the predicted signal, can allow the spectroscopic system to be calibrated for measurement operation with other targets having unknown responses.

The typical calibration method can yield erroneous measurement results if any of the operating parameters differ from the calibration operation to the measurement operation. Unfortunately, some operating parameters can differ from the calibration operation to the measurement operation. For example, output wavelength, output intensity, input power supply, operating conditions such as temperature, and component age can affect the performance of excitation source. Intensity and wavelength of the transmitted radiation, physical configuration (e.g., flexing or stretching of optical cables), and connector or cable aging can affect transmission efficiency of transmission mechanisms. Environmental conditions and repeated use can affect the performance of a spectroscopic instrument. These conditions can not generally be held constant from calibration to measurement. Accordingly, a spectroscopic system calibrated according to existing calibration methods can not provide reliable, quantitative measurements of a target's response.

Some applications require that parameters be deliberately varied, as, for example, when the change in tissue response over time is significant, allowing time for spectroscopic system components to age and operating parameters to change. As another example, consider fluorescence imaging of free calcium in living cells. Living cells can be loaded with a fluorophore (Indo-1, $\lambda$excitation =365 nm) whose fluorescence shifts from 480 nm to 405 nm upon binding $Ca^{++}$. See, e.g., Bliton and Lechleiter, "Optical Considerations at Ultraviolet Wavelengths in Confocal Microscopy", Chapter 27, Handbook of Biological Confocal Microscopy, $2^{nd}$ edition, Jim Pawley editor. If a living cell is imaged at only 405 nm, intensity changes due to calcium binding cannot be differentiated from local changes in fluorophore concentrations. Consequently, cells are imaged at both 405 nm and 480 nm, and the images ratioed to remove concentration effects. However, ratioing the images cannot remove artifacts arising from changes in operating parameters such as excitation intensity fluctuation or changes in optical collection efficiency.

Current spectroscopic calibration methods do not provide the precision and repeatability necessary for quantitative spectroscopic imaging. Accordingly, there is a need for a method of calibrating spectroscopic systems that allows repeatable and quantitative calibration.

SUMMARY OF THE INVENTION

The present invention provides a method of calibrating a spectroscopic system that allows repeatable and quantitative calibration. Spots of optically-characterized material placed in the field of view of a spectroscopic system allow calibration thereof. Response from the spots is measured and used to calibrate for varying spectroscopic system operating parameters. The accurate calibration achieved allows quantitative spectroscopic analysis of responses taken at different times, different excitation conditions, and of different targets.

The method comprises placing one or more spots of optically-characterized material in the field of view of the spectroscopic system. The spectroscopic system directs excitation radiation along an excitation radiation path to the field of view, impinging on both a target and the spots. The spectroscopic system collects a response from the field of view, including a response from the spots and a response from the target. The response from the spots can be combined with the response from the target to obtain a calibrated target response. The method can be used sequentially to calibrate multiple target response signals to each other.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a method of calibrating spectroscopic systems that allows repeatable and quantitative calibration.

Figure 1:
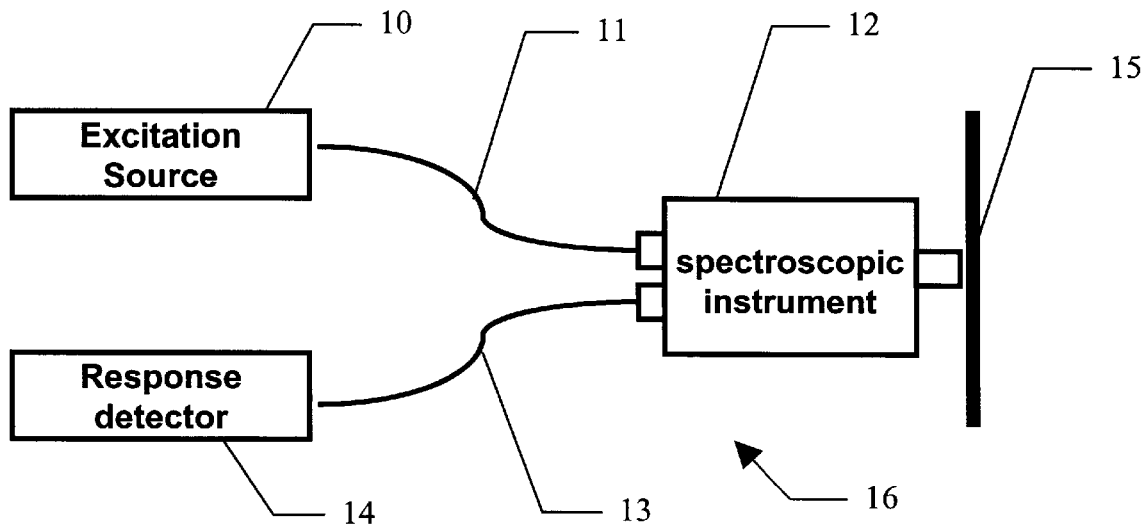
FIG. 1 is an illustration of an existing spectroscopic system.

FIG. 1 depicts the general functions present in existing spectroscopic systems. Spectroscopic system 16 comprises excitation source 10, transmission means 11, 13, response detector 14, and spectroscopic instrument 12. Excitation source 10 provides excitation radiation, for example by using a laser or a high intensity lamp. First transmission mechanism 11 delivers excitation radiation from excitation source 10 to spectroscopic instrument 12. Spectroscopic instrument 12 directs excitation radiation to a target 15. Spectroscopic instrument 12 also collects the response of target 15 to the excitation radiation. Second transmission mechanism 13 delivers the collected response to response detector 14. Response detector 14 generates signals representative of collected response. A user or a control system (not shown) can control excitation source 10 and response detector 14. A user or an analysis system (not shown) can interpret signals from response detector 14.

The signal from response detector 14 depends on the response of target 15. It also depends on many other parameters, including the output performance of excitation source 10, the transmission characteristics of first 11 and second 13 transmission mechanisms, the performance of instrument 12, the environment surrounding target 15, and the wavelength and amplitude sensitivity of response detector 14. A calibration method can attempt to quantify all the parameters, so that signals from response detector 14 signify the actual response of target 15.

Figure 2:
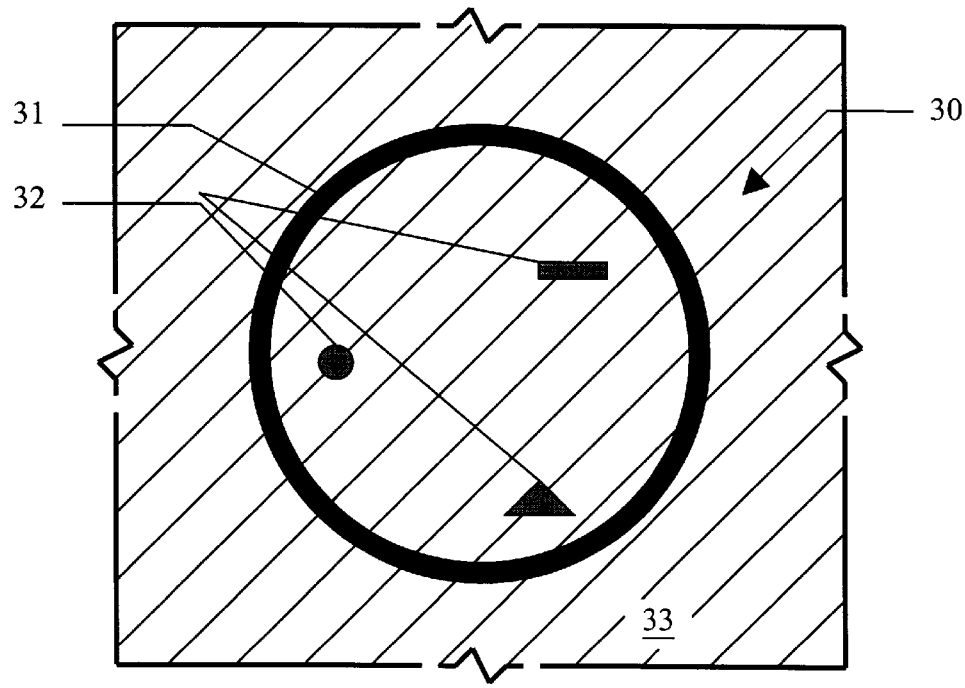
FIG. 2 is an illustration of an improved spectroscopic system according to the present invention.

FIG. 2 shows a portion of a spectroscopic instrument 30. Spectroscopic instrument 30 has a defined field of view 31. The response of a portion of a target 33 in the field of view defined by circle 31 to incident excitation radiation can be measured with spectroscopic instrument 30. Calibration spots 32 can mount with the spectroscopic instrument 30 in the field of view 31. Excitation radiation incident on target 33 and excitation radiation incident on calibration spots 32 follow the same optical path from an excitation source (not shown) to spectroscopic instrument field of view 31. Moreover, the measured response from target 33 and the measured response from calibration spots 32 follow the same path from spectroscopic instrument field of view 31 to a detector (not shown). The measured response from calibration spots 32, compared with the known, expected response of calibration spots 32, can provide information to calibrate the measured response from target 33.

Calibration spots 32 can be made from a well characterized luminescent, phosphorescent, fluorescent, reflective, or scattering material, i.e., a material with a known response to incident excitation radiation. Examples of suitable materials for calibrations spots include luminescent, phosphorescent, fluorescent, reflective, or scattering materials. For example, Rhodamine and fluorescein are suitable fluorescent dyes; sodium iodide is a suitable nonfluorescent scatterer.

Figure 3:
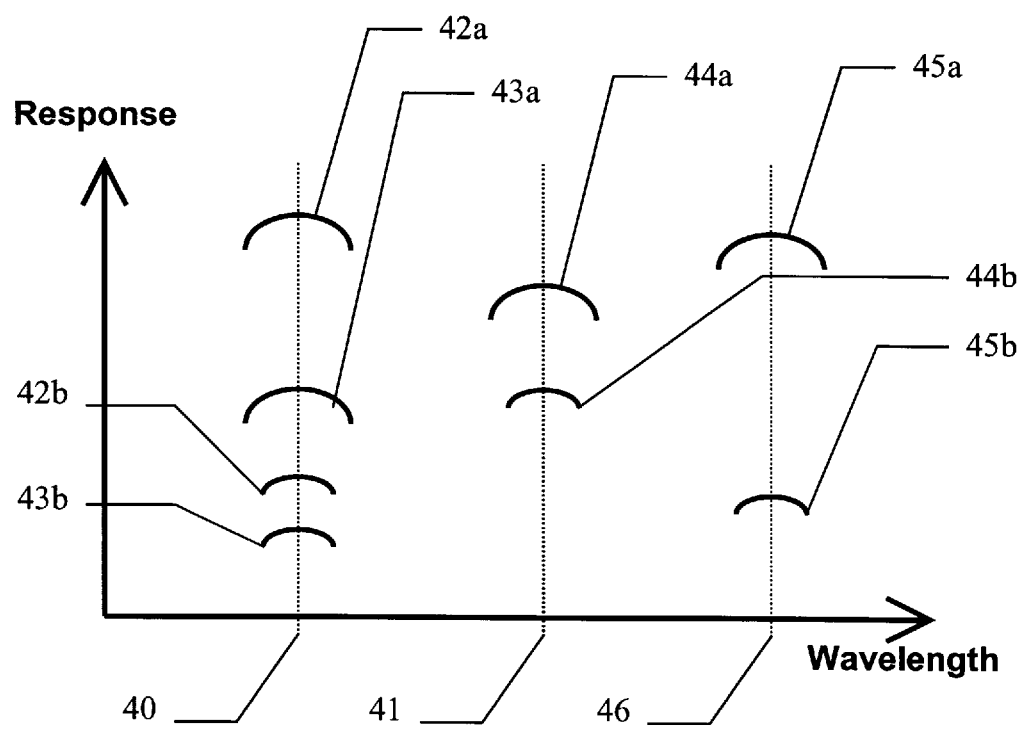
FIG. 3 is an illustration of target response in a spectroscopic system according to the present invention.

FIG. 3 shows a representation of measured target and calibration spot responses to excitation radiation. The response curves shown are for ease of illustration; those skilled in the art will appreciate multidimensional responses as well as various calibration spot response to target response relationships. The responses shown can be in response to excitation radiation of the same or different intensities. First measured calibration spot response 42*b* was measured contemporaneously with first measured target response 42*a*, representing the calibration spot response and target response at excitation radiation wavelength 40. Second measured calibration spot response 43*b* was measured contemporaneously with second measured target response 43*a*, representing the calibration spot response and target response at excitation radiation wavelength 40. Second measured target response 43*a* can represent the response of the same target as first measured target response 42*a*, measured at a different time or under different conditions. The difference between first measured calibration spot response 42*b* and second measured calibration spot response 43*b* can provide information to quantitatively compare first measured target response 42*a* and second measured target response 43*b*. Variances due to varying spectroscopic system performance can affect the measured calibration spot responses as well as the measured target responses. Because the physical response characteristics of the calibration spot are unchanged, differences in measured calibration spot response correspond to differences in spectroscopic system operating parameters. Accordingly, measured target responses 42*a*, 43*a* can be quantitatively compared after first calibrating for spectroscopic system operating parameter differences as determined from comparison of measured calibration spot responses 42*b*, 43*b*.

Alternatively, second measured target response 43*a* can represent the response of a different target than first measured target response 42*a*. As discussed above, differences in measured calibration spot response can be solely due to differences in spectroscopic system operating parameters. Accordingly, the measured responses of the two different targets can be quantitatively compared after first calibrating for spectroscopic system operating parameter differences as determined from comparison of measured calibration spot responses 42*b*, 43*b*.

Third measured calibration spot response 44*b* was measured contemporaneously with third measured target response 44*a*, representing the calibration spot response and target response at excitation radiation wavelength 41. Fourth measured calibration spot response 45*b* was measured contemporaneously with fourth measured target response 45*a*, representing the calibration spot response and target response at excitation radiation wavelength 46. Third 44*a* and fourth 45*a* measured target responses can represent measured responses from the same target as first measured target response 42*a*. Differences in measured target response can represent differences in material properties (as determined from differing responses at different excitation radiation wavelength), or can represent differences in spectroscopic system operating parameters. Measured calibration spot responses 42*b*, 44*b*, 45*b* can provide information to calibrate measured target responses 42*a*, 44*a*, 45*a*. As discussed above, differences in measured calibration spot response can be solely due to differences in spectroscopic system performance and environmental conditions. Accordingly, the measured responses of the target to different excitation radiation wavelengths can be quantitatively compared after first calibrating for spectroscopic system operating parameter differences as determined from comparison of measured calibration spot responses 42*b*, 44*b*, 45*b*.

As an example, consider a spectroscopic system that excites the target with 400 nm radiation and collects images at 450 nm, 500 nm, and 550 nm. The spectroscopic system also excites at 550 nm and collects images at 600 nm, 650 nm, and 700 nm. The fluorescent dye Lucifer Yellow excites at 400 nm and emits from 500 nm to 600 nm, and the fluorescent dye Propidium Iodide excites at 550 nm and emits from 580 nm to 700 nm.

One calibration spot of each dye at the edge of the field of view can calibrate the spectroscopic system over the range of excitation and image collection wavelengths. The calibration spots can be placed, for example, on the sample itself, on a window in contact with the sample, or on a window or protrusion into any conjugate image plane. Consider calibration spots placed on a window that contacts the specimen. The calibration spots (of whatever shape) can be at the edges of the field-of-view and the dye concentration can be chosen so that the brightness of the spots is on the order of the brightness of the expected target signal. The size of the calibration spots can be large enough that they are easily and distinctly measured; preferably their size is large compared to an image pixel and small compared to image features of interest.

Since the calibration spots are tied to the instrument, their position is stationary in any image. Image processing software can integrate the intensity over the region of interest associated with each calibration spot and report an unambiguous calibration number. The effects of image intensity on the spots can be removed by masking the area under the calibration spots, or by subtracting a local average near but outside the calibration spot region of interest.

The calibration numbers (as described above) are calculated for every excitation/emission pair and for every image. Quantitative results can be obtained by scaling image intensities so that the calibration numbers are time invariant (to remove temporal fluctuations for a time series of images) or so that the ratio of calibration numbers remains constant (to remove spectroscopic system fluctuations during a series of multispectral images).

For quantitative imaging a standard specimen can be imaged and the ratio of calibration signal to the standard response can be calculated. When a target is imaged, intensity values at each pixel can be related to known values using the calibration spots. In the course of imaging a single target at multiple wavelengths the spectroscopic system response can change as excitation sources fluctuate or the optical train of a remote probe moves over time. Rescaling calibration spot intensities to the standard value for a given excitation/emission wavelength set can yield quantitative images whose signals are spectroscopic system independent.

Signal from the calibration spots preferably span all of the required excitation/emission pairs for a given experiment. This can be one spot for a simple measurement, with the number of spots growing as the wavelength range of interest grows.

The calibration spots and the specimen can be imaged in their linear response range. Additional measurements can extend the calibration method into the nonlinear regimes such as saturation.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method of calibrating a spectroscopic system having a field of view, comprising:
    a) mounting at least one spot of an optically characterized material with the spectroscopic system at known locations in the field of view;
    b) positioning the spectroscopic system relative to a target so that the target is at least partially within the field of view;
    c) applying excitation radiation to the field of view;
    d) collecting a response from at least part of the field of view;
    e) obtaining a calibration response signal from the response from the locations in the field of view occupied by the spots;
    f) obtaining a first target response signal from the response from the locations in the field of view occupied by the target; and
    g) obtaining a calibrated target response signal from the first target response signal and the calibration response signal.

2. The method of claim 1, wherein the optically characterized material is chosen from the group consisting of: luminescent materials, phosphorescent materials, fluorescent materials, reflective materials, and scattering materials.

3. The method of claim 1, wherein the optically characterized material is chosen from the group consisting of: rhodamine, fluorescein, and sodium iodide.

4. The method of claim 1, wherein the spectroscopic system comprises a window to be placed near a target, and wherein the step of mounting at least one spot comprises applying an optically characterized material to a face of the window at known locations on the window.

5. A method of obtaining a calibrated response signal representing a target's response to excitation radiation at a second time relative to the target's response to excitation radiation at a first time, using a spectroscopic system having a field of view, comprising:
    a) mounting at least one spot of an optically characterized material with the spectroscopic system at known locations in the field of view;
    b) at the first time:
        i) positioning the spectroscopic system relative to the target so that the target is at least partially within the field of view;
        ii) applying a first excitation radiation to the field of view;
        iii) collecting a first response from at least part of the field of view;
        iv) obtaining a first calibration response signal from the first response from the locations in the field of view occupied by the spots;
        v) obtaining a first target response signal from the first response from the locations in the field of view occupied by the target;
    c) at the second time:
        i) positioning the spectroscopic system relative to the target so that the target is at least partially within the field of view;
        ii) applying a second excitation radiation to the field of view;
        iii) collecting a second response from at least part of the field of view;
        iv) obtaining a second calibration response signal from the second response from the locations in the field of view occupied by the spots;
        v) obtaining a second target response signal from the second response from the locations in the field of view occupied by the target; and
    d) obtaining the calibrated response signal from the first target response signal, the second target response signal, the first calibration response signal, and the second calibration response signal.

6. The method of claim 5, wherein the first excitation radiation has substantially the same wavelength as the second excitation radiation.

7. The method of claim 5, wherein the first excitation radiation has substantially the same intensity as the second excitation radiation.

8. The method of claim 5, wherein the optically characterized material is chosen from the group consisting of:

luminescent materials, phosphorescent materials, fluorescent materials, reflective materials, scattering materials, rhodamine, fluorescein, and sodium iodide.

9. The method of claim 5, wherein the system comprises a window to be placed near a target, and wherein the step of mounting at least one spot comprises applying an optically characterized material to a face of the window at known locations on the window.

10. The method of claim 5, wherein the final step comprises scaling the second target response signal by the ratio of the first calibration response signal to the second calibration response signal.

11. A method of obtaining a calibrated response signal representing a first target's response to excitation radiation relative to a second target's response to excitation radiation, using a spectroscopic system having a field of view, comprising:

a) mounting at least one spot of an optically characterized material with the spectroscopic system at known locations in the field of view;
   b) positioning the spectroscopic system relative to the first target so that the first target is at least partially within the field of view;
   c) applying a first excitation radiation to the field of view;
   d) collecting a first response from at least part of the field of view;
   e) obtaining a first calibration response signal from the first response from the locations in the field of view occupied by the spots;
   f) obtaining a first target response signal from the first response from the locations in the field of view occupied by the first target;
   g) positioning the spectroscopic system relative to the second target so that the second target is at least partially within the field of view;
   h) applying a second excitation radiation to the field of view;
   i) collecting a second response from at least part of the field of view;
   j) obtaining a second calibration response signal from the second response from the locations in the field of view occupied by the spots;
   k) obtaining a second target response signal from the second response from the locations in the field of view occupied by the second target; and
   l) obtaining the calibrated response signal from the first target response signal, the second target response signal, the first calibration response signal, and the second calibration response signal.

12. The method of claim 11, wherein the first excitation radiation has substantially the same wavelength as the second excitation radiation.

13. The method of claim 11, wherein the first excitation radiation has substantially the same intensity as the second excitation radiation.

14. The method of claim 11, wherein the optically characterized material is chosen from the group consisting of: luminescent materials, phosphorescent materials, fluorescent materials, reflective materials, and scattering materials.

15. The method of claim 11, wherein the optically characterized material is chosen from the group consisting of: rhodamine, fluorescein, and sodium iodide.

16. The method of claim 11, wherein the spectroscopic system comprises a window to be placed near a target, and wherein the step of mounting at least one spot comprises applying an optically characterized material to a face of the window at known locations on the window.

17. The method of claim 11, wherein the final step comprises scaling the second target response signal by the ratio of the first calibration response signal to the second calibration response signal.

18. A method of obtaining a calibrated response signal representing a target's response to excitation radiation of a second wavelength relative to the target's response to excitation radiation of a first wavelength, using a spectroscopic system having a field of view, comprising:

a) mounting at least one spot of an optically characterized material with the spectroscopic system at known locations in the field of view, wherein the optically characterized material has a known relation between its response to excitation radiation of the second wavelength and its response to excitation radiation of the first wavelength;
   b) positioning the spectroscopic system relative to the target so that the target is at least partially within the field of view;
   c) applying a first excitation radiation, having the first wavelength, to the field of view;
   d) collecting a first response from at least part of the field of view;
   e) obtaining a first calibration response signal from the first response from the locations in the field of view occupied by the spots;
   f) obtaining a first target response signal from the first response from the locations in the field of view occupied by the target;
   g) positioning the spectroscopic system relative to the target so that the target is at least partially within the field of view;
   h) applying a second excitation radiation, having the second wavelength, to the field of view;
   i) collecting a second response from at least part of the field of view;
   j) obtaining a second calibration response signal from the second response from the locations in the field of view occupied by the spots;
   k) obtaining a second target response signal from the second response from the locations in the field of view occupied by the target; and
   l) obtaining the calibrated response signal from the known relation of the optically characterized material, first target response signal, the second target response signal, the first calibration response signal, and the second calibration response signal.

19. The method of claim 18, wherein the first excitation radiation and the second excitation radiation have substantially the same intensity.

20. The method of claim 18, wherein the optically characterized material is chosen from the group consisting of: luminescent materials, phosphorescent materials, fluorescent materials, reflective materials, and scattering materials.

21. The method of claim 18, wherein the optically characterized material is chosen from the group consisting of: rhodamine, fluorescein, and sodium iodide.

22. The method of claim 18, wherein the system comprises a window to be placed near a target, and wherein the step of mounting at least one spot comprises applying an optically characterized material to a face of the window at known locations on the window.

23. The method of claim 18, wherein the final step comprises scaling the second target response signal by the ratio of the first calibration response signal to the second calibration response signal and by the known relation of the optically characterized material.

* * * * *